United States Patent
Bissonnette et al.

(10) Patent No.: US 6,845,540 B1
(45) Date of Patent: Jan. 25, 2005

(54) WIPER PIVOT HOUSING WITH SPRING RELEASE PIVOT SHAFT

(75) Inventors: Lee A. Bissonnette, Clarkston, MI (US); Kenneth W. Hensley, Farmington Hills, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 136 days.

(21) Appl. No.: 10/136,952

(22) Filed: Apr. 30, 2002

(51) Int. Cl.[7] .............................. B60S 1/34; B60S 1/16
(52) U.S. Cl. ................... 15/250.31; 15/250.3
(58) Field of Search ........................... 15/250.3, 250.31, 15/250.34, 250.202, 250.27, 250.19; 74/42, 43

(56) References Cited

U.S. PATENT DOCUMENTS

| | | | | |
|---|---|---|---|---|
| 2,187,876 A | * | 1/1940 | Ericson | 15/250.19 |
| 2,583,127 A | * | 1/1952 | Smulski | 15/250.16 |
| 2,672,760 A | * | 3/1954 | Osterman | 74/78 |
| 4,718,712 A | | 1/1988 | Nakatani | |
| 4,943,102 A | | 7/1990 | Hamamoto et al. | |
| 6,216,309 B1 | | 4/2001 | Goto et al. | 15/250.31 |
| 6,237,185 B1 | | 5/2001 | Goto et al. | 15/250.31 |
| 6,254,167 B1 | | 7/2001 | Goto et al. | |
| 6,505,376 B1 | | 1/2003 | Kagawa | |
| 6,513,186 B1 | | 2/2003 | Zimmer | |
| 6,519,802 B2 | * | 2/2003 | Lee | 15/250.19 |
| 2001/0001336 A1 | | 5/2001 | Kobayashi et al. | 15/250.3 |
| 2001/0011831 A1 | | 8/2001 | Ohasi et al. | 296/96.17 |
| 2002/0083544 A1 | | 7/2002 | Masuda | |
| 2003/0001407 A1 | | 1/2003 | Hoshikawa et al. | |

FOREIGN PATENT DOCUMENTS

| | | | | |
|---|---|---|---|---|
| DE | 882809 | * | 7/1953 | 15/250.31 |
| DE | 2727454 | * | 12/1978 | 15/250.34 |
| EP | 0 916 559 | | 5/1999 | |
| EP | 1 074 442 | | 2/2001 | |
| EP | 1 083 101 | | 3/2001 | |
| FR | 841121 | * | 2/1939 | 15/250.31 |
| FR | 842355 | * | 6/1939 | 15/250.31 |
| GB | 2 327 598 | | 2/1999 | |
| GB | 2 347 340 | | 9/2000 | |
| JP | 11 301420 | | 11/1999 | |
| JP | 2000062575 | | 2/2000 | |
| JP | 20000326830 | | 11/2000 | |

\* cited by examiner

*Primary Examiner*—Gary K. Graham
(74) *Attorney, Agent, or Firm*—J. Gordon Lewis

(57) ABSTRACT

A wiper apparatus for a vehicle windshield has a wiper arm pivot rotatably mounted in a pivot holder fixedly secured to vehicle structure. An end portion of the wiper arm pivot normally extends exteriorly of an impact line defined by surrounding vehicle structure. The wiper arm pivot is axially displayable relative to the pivot holder upon the imposition of an impact load on the exposed end of the wiper arm pivot. An axial displacement biasing member is coupled to the wiper arm pivot for normally biasing the wiper arm pivot to a normal wiper arm wiping position. The axial displacement member returns the wiper arm pivot to the nominal wiping position after the impact load causing axial displacement of the wiper arm pivot has been removed from the wiper arm pivot.

9 Claims, 2 Drawing Sheets

WIPER PIVOT HOUSING WITH SPRING RELEASE PIVOT SHAFT

BACKGROUND

The present invention relates, in general, to vehicle windshield or wiper assemblies and, more specifically, to vehicle windshield wiper assemblies having pedestrian collision safety features.

In vehicle windshield wiper assemblies, wiper blades are mounted on wiper arms. The wiper arms, in turn, carry a mount which is attached to a rotatable pivot shaft. The pivot shaft is rotatably mounted in a pivot shaft housing or holder fixedly mounted on vehicle structure, such as on the vehicle plenum or cowl panel immediately below the lower edge of the vehicle windshield. Although two wiper blades and wiper arms are normally provided on a single windshield, only one of the pivot shafts is typically coupled by a drive lever to a drive source, such as an electric motor. Linkages connect the pivot shaft of one wiper arm to the pivot shaft of the other wiper arm to impart reciprocal motion to both pivot shafts when the motor reciprocally drives the one pivot shaft.

Recent studies have shown that pedestrians have a high likelihood of injury when struck by a vehicle traveling at above certain speeds. Such injuries occur when the pedestrian is thrown by impact with the front bumper or front fenders of the vehicle hood onto the hood where the pedestrian's head and/or torso then contacts the windshield with considerable force.

Although windshield wiper assemblies are provided in a large number of different configurations, typical wiper assemblies have the upper end of the pivot shaft and the wiper arm attached thereto protruding above an impact line usually defined by the exterior surface of the vehicle hood. As the pivot shaft, although rotatable in the pivot holder, is nevertheless fixed relative to the vehicle structure, the protruding portions of the wiper assembly act as a fixed object or projection which increases the likelihood of serious injury to a pedestrian during a collision.

Certain countries or regional groups have initiated legislation to protect pedestrians and other road users in the event of a collision with a vehicle. Under such legislation, manufacturers will have to insure that the pivot shafts of windshield wiper assemblies do not act as an external projection during a pedestrian collision with a vehicle.

As a result, windshield wiper manufacturers have provided a number of different pivot shaft mounting arrangements which are capable of pivoting below the hood impact line or breaking away from the fixed mount to the vehicle structure and dropping below the vehicle hood so as to lower the protruding portion of the pivot shaft and the wiper arm below the impact line during a pedestrian collision.

However, providing a pivot shaft mounting design which is capable of pivotal movement under impact is directly opposed to the wiper system requirements of a solid mount for torsional loading and radial force management. In current pivot housing assemblies, the pivot shaft is solidly mounted in the axial direction in the pivot shaft housing. The pivot shaft is constrained within the pivot housing by various methods. One example utilizes a solid ring with full contact to the pivot shaft so as to exert a retaining force on the pivot assembly. Another example is an E-clip retaining ring that fits into a slot on the pivot shaft and mechanically retains the pivot shaft in the pivot shaft housing. On the other end of the pivot shaft, the pivot assembly is constrained by the interference caused by embedded knurling in the pivot shaft and the interference hole in the mating drive plate when the two pieces are mechanically riveted together.

While this current pivot shaft housing design has sufficient strength in both the axial and radial directions so as to meet current federal and customer requirements, the design is ineffective in minimizing injury from the impact load of a pedestrian.

Thus, it would be desirable to provide a vehicle windshield wiper apparatus having a rotatable pivot shaft which meets the wiper system requirements for torsional and radial force loading while still being capable of axial displacement so as to lower any exposed end portion of the pivot shaft a vehicle hood impact line to prevent substantial contact between a pedestrian and the exposed portions of the pivot shaft during a pedestrian/vehicle collision. It would also be desirable to provide such a vehicle windshield wiper apparatus having a pivotal housing providing a pedestrian collision safety feature capable of movement back to a normal wiper arm mounting position after the impact forces are removed.

SUMMARY OF THE INVENTION

The present vehicle wiper pivot housing with a spring release, axially displacable pivot shaft uniquely meets the requirements of solid wiper system mounting for torsional loading and radial force requirements and an impact load pivot shaft displacement feature for pedestrian safety during a pedestrian/vehicle collision. This pedestrian safety feature is provided in a manner which enables the wiper arm to be returned to the normal wiping position after the impact forces are removed without damage to the wiper apparatus. Further, the wiper apparatus with the unique pivot shaft displacement can be provided in different design configurations to meet the various wiper configurations found in current vehicles.

The present invention is a wiper pivot housing with a biased, axially displacable pivot shaft which provides a safety feature preventing forced contact between a pedestrian and external portions of the wiper apparatus during a pedestrian/vehicle collision.

In one aspect, the wiper apparatus includes a pivot holder which is adapted to be fixedly mounted to the vehicles. A wiper arm pivot is rotatably mounted in the pivot holder, the wiper arm pivot adapted for carrying a wiper arm at one end. One end of the wiper pivot is adapted for extending exteriorly of vehicle structure adjacent to the wiper arm when the wiper pivot is mounted in a normal wiping operation position. The wiper pivot is adapted for axial displacement under a predetermined impact force exerted on the exposed end of the wiper pivot in an amount to lower the exposed end of the wiper pivot below the surrounding vehicle structure.

In one aspect, an axial displacement means or member is operably coupled to and acts on the wiper arm pivot for biasing the wiper arm pivot to a normal wiper arm wiping position and for allowing axial displacement of the wiper arm pivot from the normal wiping position upon the imposition of an impact force.

In one aspect, the axial displacement means or member is a coil spring. The coil spring is mounted about the wiper arm pivot and disposed alternately within the bore in the pivot holder or exteriorly at one end of the pivot holder.

In one aspect of the invention, a pivotally movable drive member, adapted for coupling to an output shaft of a drive motor, is non-rotatably fixed to the wiper arm pivot, but allows axial displacement of the wiper arm pivot relative thereto upon the imposition of an impact force on the wiper arm pivot.

The wiper apparatus of the present invention provides a unique axially displacable wiper arm pivot which is capable of axial displacement relative to the surrounding fixed pivot holder upon the imposition of an impact force greater than a predetermined magnitude on an end of the wiper arm pivot normally exposed above surrounding vehicle structure. The axial displacement is an amount sufficient to allow the external end of the wiper arm pivot to retract below the surrounding vehicle structure to minimize fixed contact between the wiper arm pivot and a pedestrian impacting with the vehicle structure during a collision.

At the same time, the axial displacable wiper arm pivot retains sufficient strength in the axial and radial directions to provide a solid mount for torsional loading and radial force management during normal wiper arm movement.

The wiper apparatus with an axially displacable wiper arm pivot according to the present invention may be embodied in different configurations for use in the numerous wiper apparatus configurations found in current vehicle.

BRIEF DESCRIPTION OF THE DRAWING

The various features, advantages and other uses of the present invention will become more apparent by referring to the following detailed description and drawing in which.

DETAILED DESCRIPTION

Figure 1:
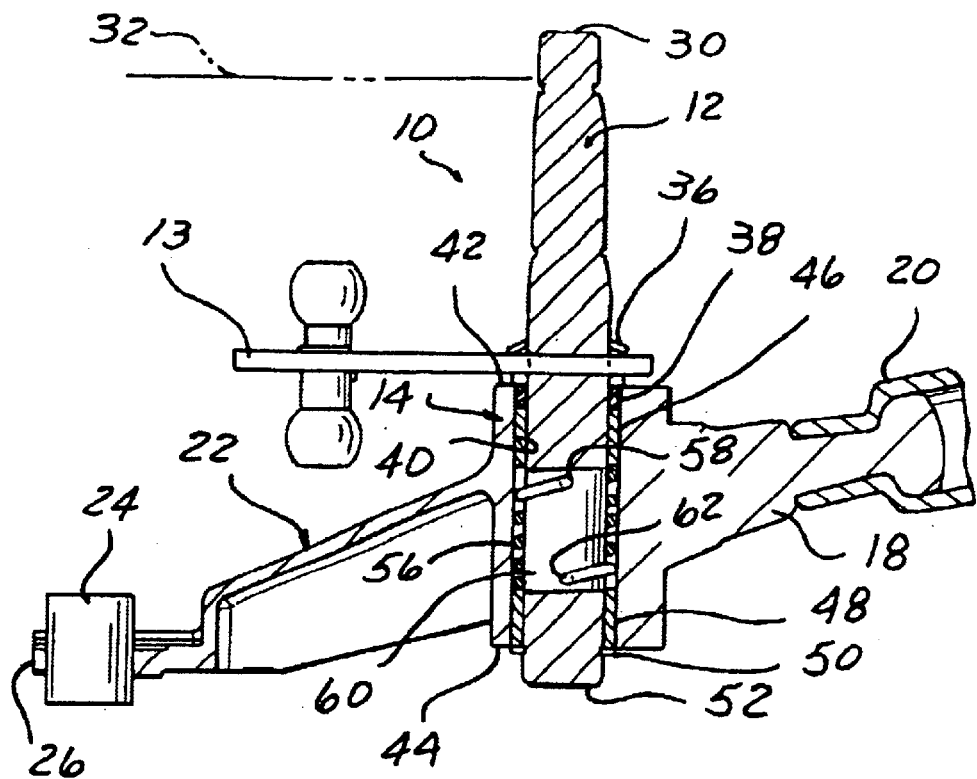
FIG. 1 is a partially cross-sectioned, side elevational view of a vehicle wiper pivot assembly shown in a normal wiping position in accordance with one aspect of the present invention.

Referring now to FIGS. 1–4, there is depicted various aspects of a vehicle windshield wiper apparatus 10, which is only partially shown as the present wiper apparatus 10 may be employed with many different wiper arm configurations.

As a large number of the components in a vehicle windshield wiper apparatus are conventional, such are not shown in order that the features of the present invention may be more clearly identified. However, it will be understood that the wiper apparatus 10 utilizes a drive motor connected by a drive lever 13 to a pivot shaft 12 rotatably mounted in a pivot shaft holder or housing 14.

A tenon 18 also extends from the housing 14 and receives one end of a tube 20 for connecting rotation of the pivot shaft 12 to slave rotation of another pivot shaft, not shown, for operating the other windshield wiper on a vehicle.

An arm 22 extends from the pivot shaft housing 14 and receives a fastener 24 in a mounting end 26 for fixedly securing the pivot holder 14 to stationary vehicle structure, such as a cowl panel, intake plenum, etc.

As shown in FIG. 1, at least an upper, exposed portion 30 of the pivot shaft 12 is disposed exteriorly of an impact line 32 which is generally formed by a major plane of a vehicle hood, not shown. The exposed end 30 of the pivot shaft 12, which receives a not shown wiper arm, is disposed adjacent to a bottom edge of a vehicle windshield, not shown.

The wiper pivot assembly 10 shown in FIG. 1 is a so-called "top drive" wiper system in that the drive lever 13 is mounted on top of one end of the pivot housing 14. A spring washer or retainer clip 36, such as a C-clip is disposed about one end of the drive lever 13 to axially fix the drive plate 13 relative to the pivot housing 14 such that the drive plate 13 has an aperture at one end with internal grooves which mate with grooves in the pivot shaft 14. Movement of the drive plate 13 is generated by rotation of the output shaft of the wiper drive motor, not shown, and imparts bi-directional rotation to the pivot shaft 12 in a conventional manner. However, the clip 36 restrains the pivot shaft 12 in an upward direction from the pivot housing 14.

A seal member, such as a O-ring 38, is mounted in a through bore 40 extending between a first end 42 and an opposed second end 44 of the pivot housing 14. Also mounted in the through bore 40 are first and second bushings 46 and 48 which are disposed between the inner surface of the bore 40 and the pivot shaft 12. Another retainer or C-clip 50 is disposed on the second end 44 of the pivot housing 14 and engages a slot formed at a second end 52 of the pivot shaft 12 to axially restrain the pivot shaft 12 relative to the pivot housing 14.

In this aspect of the present invention, the pivot shaft 12 is mounted in the pivot shaft housing 14 for selective axial displacement in the direction to lower the normally exposed or external end 30 of the pivot shaft 12 below the vehicle impact line 32 under an impact load on the exposed end 30 of the pivot shaft 12. The axial displacement feature is provided by a biasing means, such as a coil spring 56, which is mounted in the bore 40 of the pivot housing 14 between the first and second bushings 44 and 46 and concentrically about an intermediate portion of the pivot shaft 12. In one aspect shown in FIG. 1, the pivot shaft 12 has a constant diameter cross-section at least for the portion of the pivot shaft 12 which normally extends through the bore 40 in the pivot housing 14. A transverse bore 58 is formed in an intermediate portion 60 of the pivot shaft 12 to receive one end of the biasing means or spring 56. A similar transverse bore 62 is formed at an opposite end of the intermediate portion 60 of the pivot shaft 12 to receive the opposite end of the spring 56 to thereby mount the spring 56 on the pivot shaft 12 and between the bushings 46 and 48.

In this position, the biasing means or spring 56 is normally biases the pivot shaft 12 to a normal wiper arm mounting position wherein the end 30 of the pivot shaft 12 extends exteriorly and outwardly above the vehicle impact line 32 for normal bidirectional wiper arm movement under control of the wiper motor.

Figure 2:
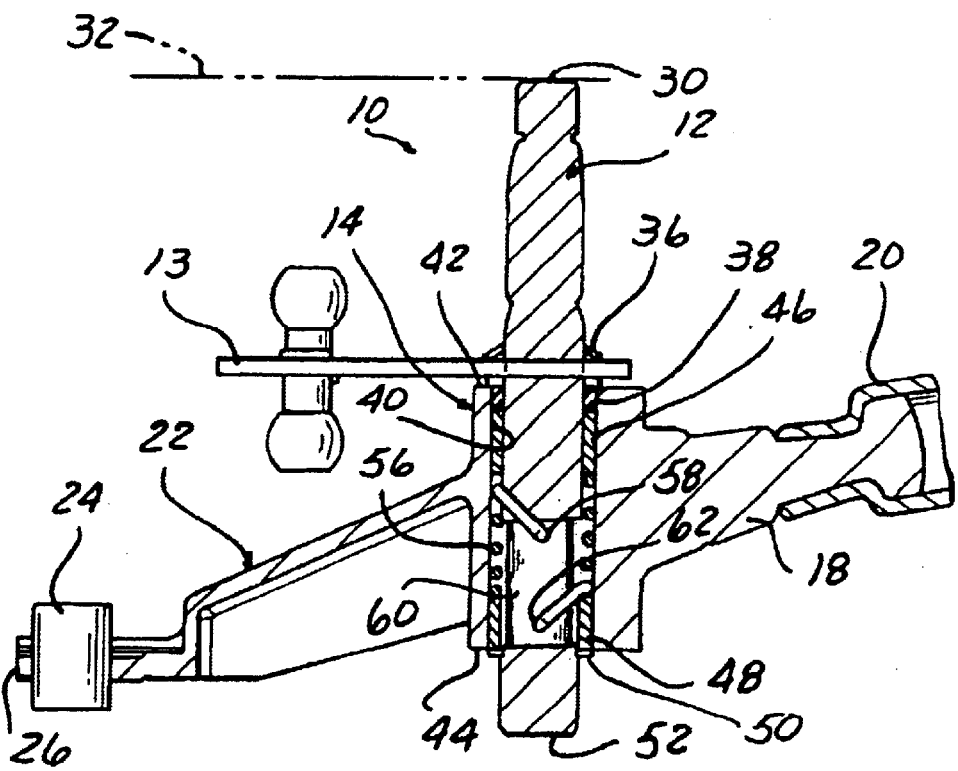
FIG. 2 is a partially cross-sectioned, side elevational view, similar to FIG. 1, but showing the position of the wiper pivot shaft during a pedestrian impact on the exterior end of the pivot shaft.

However, an impact load caused by a pedestrian impacting on the wiper arm and/or the exposed end 30 of the pivot shaft 12 during a pedestrian/vehicle collision, where the impact load is above a predetermined magnitude, will overcome the biasing force of the spring 56 and cause axial displacement of the pivot shaft 12 relative to the pivot housing 14 in a direction to lower the exterior end 30 of the pivot shaft 12 below the vehicle impact line 32 to prevent forced contact between the pedestrian and the exterior end 30 of the pivot shaft 12. Such axial displacement can be 0.040 to 0.800 inches, for example, as shown in FIG. 2. Alternatively, the displacement range can be made small or larger depending on vehicle architecture.

During this movement, the portion of the pivot shaft 12 which is nominally inside of the bore 40 in the pivot housing 14 axially displaces or slides through the bore 40 in a direction to move the second end 52 of the pivot shaft 12 further away from the second end 44 of the pivot housing 14. The retainer clip 36 on the drive plate 13 and the mating grooves on the drive plate 13 and the pivot shaft 12 allows this axial displacement without axial movement of the drive plate 13.

At the same time, when the impact load on the end 30 of the pivot shaft 12 is removed, the biasing means or spring 56 can reassert its biasing force on the pivot shaft 12 causing return axial displacement of the pivot shaft 12 relative to the pivot housing 14 back to the nominal wiping position shown in FIG. 1.

Instead of mounting the ends of the biasing spring 60 in the bores 58 and 62 in the intermediate portion 60 of the pivot shaft 12, the intermediate portion 60 of the pivot shaft 12 can be formed with a reduced diameter from the cross-section of the remaining portions of the pivot shaft 12. This forms shoulders at opposite ends of the intermediate portion 60 of the pivot shaft 12 which act as seats for a coil spring forming the biasing means 56. In this aspect, the ends of the coil spring need not be directly attached to the pivot shaft 12.

Figure 3:
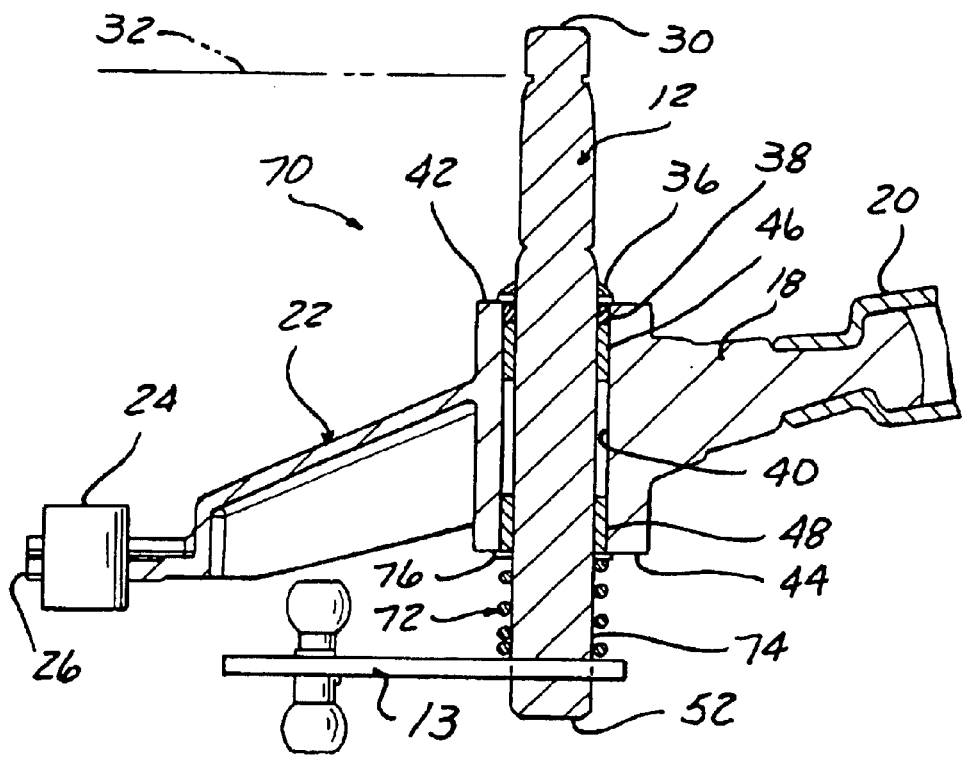
FIG. 3 is a partially cross-sectioned, side elevational view of a vehicle wiper apparatus shown in a normal wiping position according to another aspect of the present invention.

Another aspect of a wiper apparatus 70 of the present invention is shown in FIG. 3. In this aspect, the pivot housing 14, the drive plate 13 and a substantial portion of the pivot shaft 12 are substantially the same as the corresponding components in the first aspect of the invention described above and shown in FIG. 1.

The wiper apparatus 70 shown in FIG. 3 is depicted as a bottom drive-type wiper apparatus wherein the drive plate 13 is mounted on a bottom or lower end of the pivot shaft 12. In this aspect, a biasing means, such as a coil spring 72, is mounted concentrically about an intermediate portion 74 of the pivot shaft 12 located adjacent to the second end 52 of the pivot shaft 12. The spring 72 is seated between the drive plate 13 which is non-rotatably fixed to the pivot shaft 12 by a knurled connection between the drive plate 13 and the pivot shaft 12 after the pivot shaft 12 has been inserted through a bore in the drive plate 13. The opposite end of the spring 72 seats against a flat washer 76 disposed in contact with the second end 44 of the pivot housing 14.

As in the first aspect of the invention, the spring 72 normally biases the pivot shaft 12 to a normal wiper arm position wherein the end 30 of the pivot shaft 12 extends exteriorly in an exposed manner outward from the vehicle impact line 32. When an impact load is placed on the exposed end 30 of the pivot shaft 12, such as during a pedestrian/vehicle collision, the impact load exceeding a predetermined force equal to the biasing force exerted by the spring 72 will overcome the biasing force of the spring 72 and cause a predetermined amount of axial displacement of the pivot shaft 12 relative to the pivot housing 14 in a direction to extend the second end of the pivot shaft 12 further away from the second end 44 of the pivot housing 14. During such axial displacement, the coil spring 72 is compressed to store potential energy to return the pivot shaft 12 to the normal wiping position shown in FIG. 2 after the impact force is removed.

In addition, the knurled connection between the drive plate 13 and the pivot shaft 12 allows the pivot shaft 12 to axially slide through the bore in the drive plate 13 without causing corresponding movement of the drive plate 13. The pivot shaft 12 is capable of reverse axial movement through the bore in the drive plate 13 after the impact load has been removed and the biasing spring 72 forces the pivot shaft 12 back to the normal wiping position.

Figure 4:
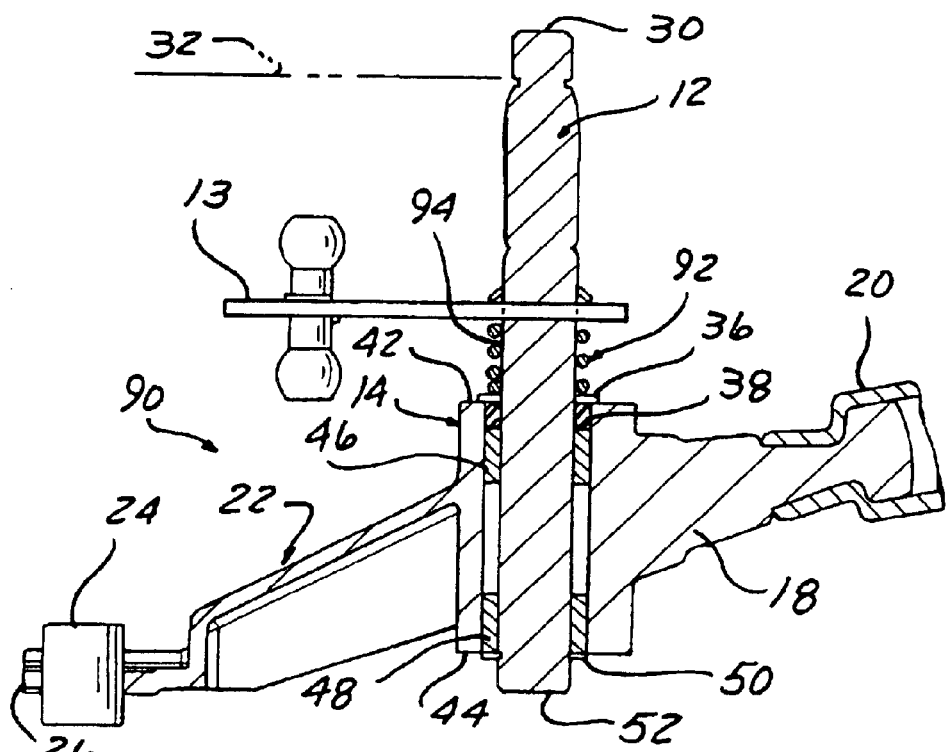
FIG. 4 is a partially cross-sectioned, side elevational view of another aspect of a vehicle wiper apparatus shown in a normal wiping position without impact loading.

FIG. 4 depicts another aspect of the present wiper apparatus 90 which is essentially the same as the aspect shown in FIG. 3 except that the biasing means or spring 92 is mounted between the clip 36 on the first end 38 of the pivot housing 14 and a so-called top mounted drive plate 13. An intermediate portion 94 of the pivot shaft 12 may have the same diameter or a reduced diameter from the opposite end portions of the pivot shaft 12. The biasing means or spring 92 is mounted about the intermediate portion 94 of the pivot shaft 12 and seats between the clip 36 and the a shoulder formed between the reduced diameter end of the intermediate portion 94 and the adjacent larger diameter end portion of the pivot shaft 12 to nominally bias the pivot shaft 12 outward to the normal wiping position shown in FIG. 4.

However, when an impact force is exerted on the exposed end 30 of the pivot shaft 12 in a magnitude that exceeds the counterbiasing force exerted by the spring 92, the impact force will cause an immediate axial displacement of the pivot shaft 12 relative to the drive plate 13 and the pivot housing 14 in a direction to lower the exposed end 30 of the pivot shaft 12 below the vehicle impact line 32.

As in the preceding aspects of the invention, when the impact force is removed from the end 30 of the pivot shaft 12, the biasing spring 92 is capable of returning the pivot shaft 12 to the nominal wiping position shown in FIG. 4.

In conclusion, there has been disclosed a unique vehicle wiper apparatus having an axially displacable pivot shaft to provide a pedestrian safety feature through axial displacement of the pivot shaft during a pedestrian impact with an external end portion of the pivot shaft to prevent forced contact between the pedestrian and the pivot shaft. This axial displacement is sufficient to allow the exposed end portion of the pivot shaft to drop below the vehicle impact line to prevent fixed contact between the pedestrian and the pivot shaft. At the same time, the axial displacement feature automatically returns the pivot shaft to the nominal wiping position after the impact force on the end of the pivot shaft is removed. The axially displacable pivot shaft of the present invention is capable of implementation in many different wiper apparatus configurations.

What is claimed is:

1. A wiper apparatus for a vehicle comprising;

a pivot holder adapted to be fixedly mounted to the vehicle;

a wiper arm pivot rotatably mounted in the pivot holder;

the wiper arm pivot adapted for axial displacement under a predetermined impact force exerted on the one end of the wiper pivot; and an axial displacement member directly coupled to the wiper arm pivot such that a portion of the axial displacement member is fixed for axial movement with the wiper arm pivot, the axial displacement member acting on the wiper arm pivot of biasing the wiper arm pivot to the normal wiping position and for allowing axial displacement of the wiper arm pivot from the normal wiping position upon the imposition of an impact force on the one end of the wiper arm pivot having at least a predetermined magnitude.

2. The wiper apparatus of claim 1 wherein:

the axial displacement member is disposed within the pivot holder.

3. The wiper apparatus of claim 2 wherein:

the wiper arm pivot having a reduced diameter portion disposed within the pivot holder, the axial displacement member mounted about the reduced diameter portion.

4. The wiper apparatus of claim 1 further comprising:

the wiper arm pivot having a reduced diameter portion; and the axial displacement member mounted about the reduced diameter portion.

5. The wiper apparatus of claim 1 further comprising:

a pivotally movable drive member non-rotatably coupled to the wiper pivot for imparting rotation to the wiper pivot upon movement of the drive member, the drive member and the wiper arm pivot disposed for relative axial movement.

6. The wiper apparatus of claim 1 wherein:

the axial displacement of the wiper arm pivot is in an amount to lower the exposed end of the wiper pivot below surrounding vehicle structure.

7. A wiper apparatus for a vehicle comprising:

a pivot holder adapted to be fixedly mounted to the vehicle;

a wiper arm pivot rotatably mounted in the pivot holder;

the wiper arm pivot adapted for axial displacement under a predetermined impact force exerted on the one end of the wiper pivot, an axial displacement member directly attached to the wiper arm pivot, such that a portion of the axial displacement member is fixed for axial movement with the wiper arm pivot, the axial displacement member being a spring.

8. A wiper apparatus for a vehicle comprising:

a pivot holder adapted to be fixedly mounted to the vehicle;

a wiper arm pivot rotatably mounted in the pivot holder;

the wiper arm pivot adapted for axial displacement under a predetermined impact force extended on the one end of the wiper pivot; and an axial displacement member directly attached to the wiper arm pivot such that a portion of the axial displacement member is fixed for axial movement with the wiper arm pivot, the axial displacement member returning the wiper arm pivot to a normal wiping position after removal of an impact force on the wiper arm pivot causing displacement of the wiper from the normal position.

9. A wiper apparatus for a vehicle comprising;

a pivotally movable drive member;

a pivot holder adapted to be fixedly mounted to the vehicle;

a wiper arm pivot rotatably mounted in the pivot holder;

one end of the wiper arm pivot adapted for extending exteriorly of vehicle structure when the wiper arm pivot is mounted in a normal wiper arm movement position; and the drive member non-rotatably coupled to the wiper pivot, the wiper arm pivot axial displaceable relative to the dive member and wherein the wiper arm pivot is axially displaceable under a predetermined impact force exerted on the one end of the wiper arm pivot in an amount to lower the one end of the wiper pivot below the surrounding vehicle structure; and an axial displacement member in the form of a spring directly coupled to the wiper arm pivot such that a portion of the axial displacement member is fixed for axial movement with the wiper arm pivot.

* * * * *